Oct. 10, 1944.  C. HUSSMAN  2,359,915
ANTI-VIBRATION SHOCK ABSORBER
Filed Nov. 7, 1941  3 Sheets-Sheet 1
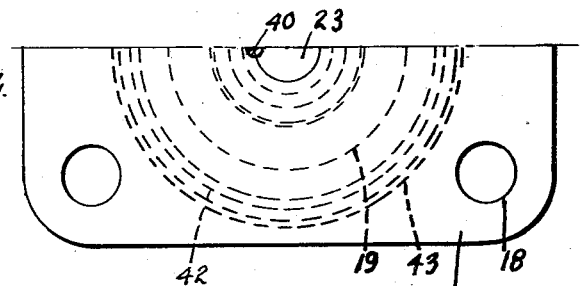
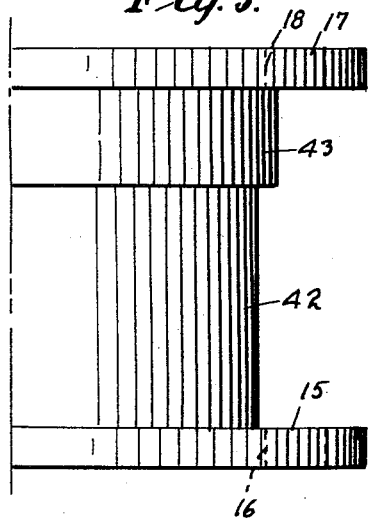
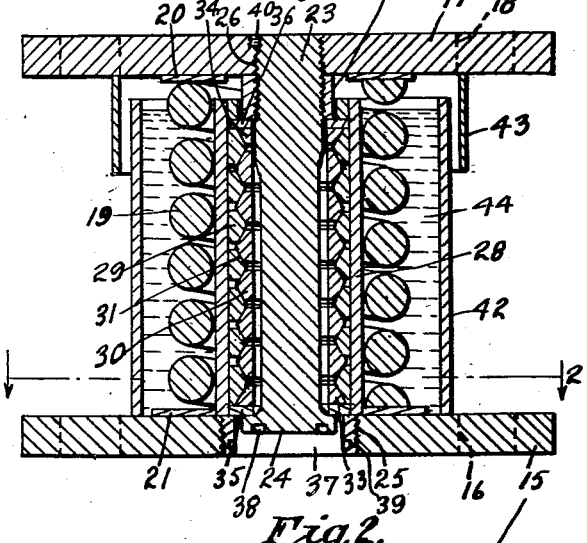
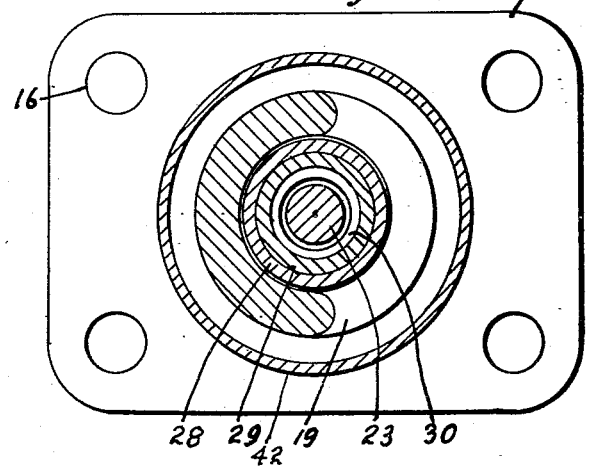
INVENTOR
CARL HUSSMAN
by L. A. Paley Atty.

Oct. 10, 1944.  C. HUSSMAN  2,359,915
ANTI-VIBRATION SHOCK ABSORBER
Filed Nov. 7, 1941  3 Sheets-Sheet 2
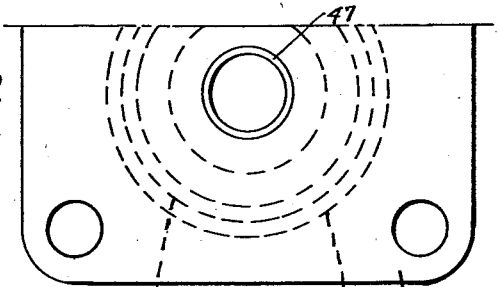
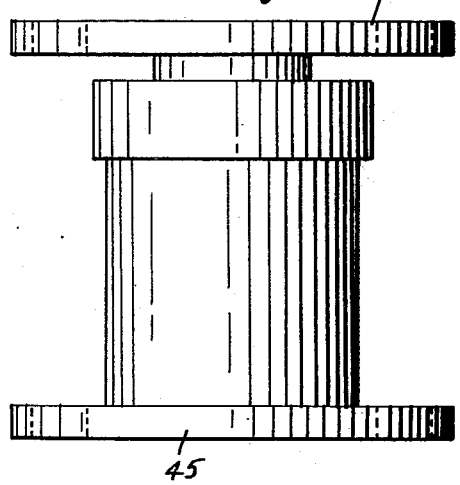
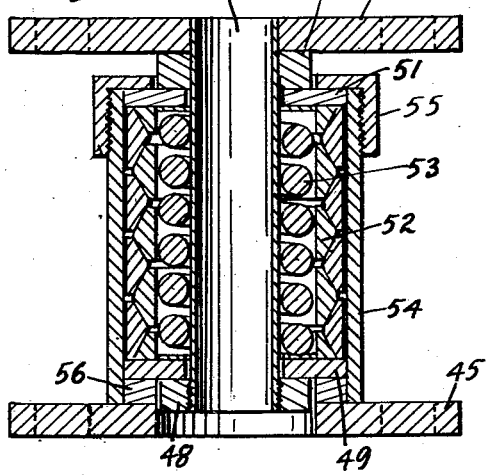
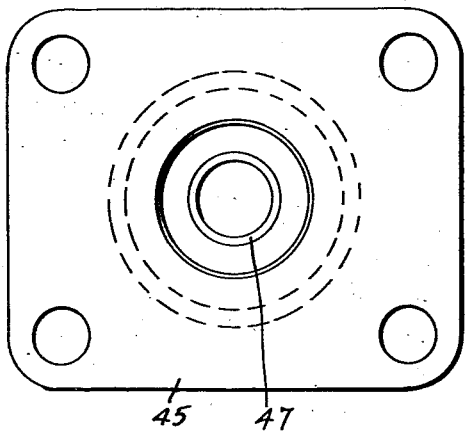
INVENTOR
CARL HUSSMAN
by L.A.Paley Atty.

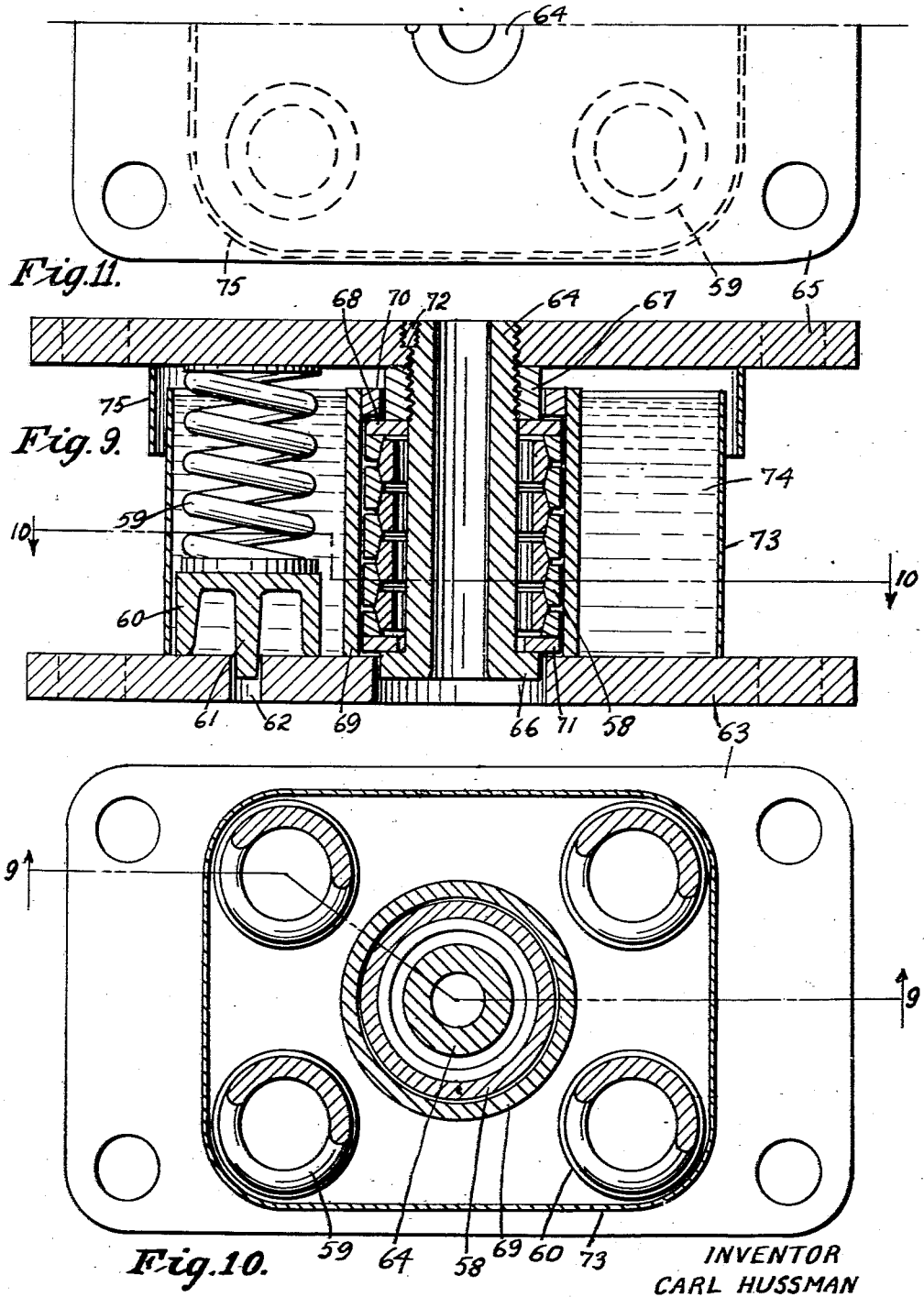

Patented Oct. 10, 1944

2,359,915

UNITED STATES PATENT OFFICE 2,359,915

ANTIVIBRATION SHOCK ABSORBER

Carl Hussman, Chicago, Ill.

Application November 7, 1941, Serial No. 418,174

7 Claims. (Cl. 267—1)

This invention relates to shock and vibration absorbers especially useful in supporting engines in submarine vessels.

In submarines, it has been found desirable to support the propelling engines on anti-vibration bases or mountings, so as to prevent undue vibration of the hull. However, it has been found that when a submarine is attacked with depth bombs, the engines are apt to tear loose from their anti-vibration mountings with the result that the submarine is unable to escape from the attacking vessel and is eventually destroyed.

An object of the invention, therefore, is to provide an engine mounting which will not only absorb the steady vibrations of the engine, but also will absorb heavy shocks due to depth bombs.

Another object of the invention is to provide an engine mounting including a viscous fluid which will react on a helical spring to absorb high frequency vibrations and side sway; also to improve engine mountings in other respects hereinafter specified and claimed.

Reference is to be had to the accompanying drawings forming a part of this specification, in which Fig. 1 is a central sectional elevation through one form of my improved engine mounting, Fig. 2 is a sectional plan view through the mounting on the line 2—2 of Fig. 1, Fig. 3 is a fragmentary elevation of the mounting, Fig. 4 is a fragmentary plan view of the mounting, Fig. 5 is a central sectional elevation through a modified form of engine mounting, Fig. 6 is an elevation of the mounting shown in Fig. 5, Fig. 7 is a bottom view of the mounting shown in Fig. 5, Fig. 8 is a plan view of the mounting shown in Fig. 5, Fig. 9 is a sectional elevation through a further modified form of mounting taken on line 9—9 of Fig. 10, Fig. 10 is a sectional plan view of the mounting shown in Fig. 9 taken on line 10—10 of Fig. 9, and Fig. 11 is a fragmentary plan view of the mounting shown in Fig. 9.

Referring to the drawings by numerals, a pair of rigid spaced plates include base 15 arranged to be attached to a floor through bolt holes 16, and a platform 17 arranged to be bolted to the base of an engine through bolt holes 18. A heavy helical spring 19 connects the central portion of base 15 and platform 17, non-metallic washers 20 and 21 being provided against platform 17 and base 15 respectively for bearing contact with the ends of spring 19. A spindle 23 extends downwardly from the central part of platform 17 and terminates at its lower end in an enlarged head 24 which extends into an opening 25 formed in the base 15. The upper end of spindle 23 is provided with screw threads 26 which engage in similar threads formed in the platfrom 17, and also engages the inside of a collar 27. A cylinder 28 is secured, as by welding, at its lower end to the upper face of base 15, said cylinder 28 fitting loosely inside of helical spring 19. Inside the cylinder 28 is loosely fitted a ring spring comprising outer rings 29 and inner rings 30. The inside of rings 29 and the outside of rings 30 are provided with mating conical friction surfaces 31. When a force or shock is applied which tends to compress the ring spring, the conical surfaces 31 slide one upon the other so that the outer rings 29 increase in diameter and the inner rings 30 decrease in diameter until the shock is absorbed. Half rings 33 and 34 are positioned at the bottom and top respectively of the ring spring. A washer 35 extends between the bottom of the ring spring and the spindle head 24, and a washer 36 extends between the top of the ring spring and the collar 27. A collar 37 is screwed into opening 25 to support the washer 35. Suitable spanner wrench openings 38 and 39 are provided in the head 24 and collar 37 respectively to permit unscrewing of these parts. A lock screw 40 is provided in the upper end of spindle 23.

A cylinder 42 is secured at its lower end as by welding, to the base 15 and a larger short telescoping cylinder 43 extends downwardly from the platform 17. A viscous liquid 44, such as asphalt of the desired viscosity, is poured hot between the cylinders 42 and 28 about helical spring 19. When cool and solidified, this asphalt serves to absorb high frequency vibrations and also serves to prevent side sway of the platform 17 due to unbalanced weight of the engine mounted on platform 17 when rolling in rough water, or for other reasons. The mounting as described will absorb the steady vibration of the engine through the helical spring 19. If a depth bomb is exploded above the ship, the hull will be driven downwardly away from the engine and spindle head 24 will act to compress the ring spring and absorb the shock without the engine breaking away from its mountings. If a depth bomb is exploded below the ship, the collar 37 will compress the ring spring and absorb the shock. The ring spring is thus double acting and absorbs large shocks from either above or below the ship.

In the device shown in Figs. 5 to 8, a base 45 is spaced apart from a platform 46. A tube or spindle 47 is secured by welding at its upper end to the platform 46. A collar 48 is screwed onto the bottom of tube 47 and bears against a washer 49. Washers 50 and 51 are positioned on the tube 47 below the platform 46. A ring spring 52 and a helical spring 53 extend between washers 49 and 51, the ring spring 52 being positioned concentrically on the outside of helical spring 53. A cylinder 54 is positioned loosely around the ring spring 52 and a cap 55 is screwed to the top of said cylinder 54. The bottom of cylinder 54 is welded to the top of base 45 and a spacer ring 56 separates the washer 49 and base 45.

In the machine mounting shown in Figs. 9 to 11, I provide increased load carrying capacity over the mountings heretofore described. This is obtained by using a larger ring spring 58 and four, more or less, helical springs 59 arranged around the ring spring 58. Each of the springs 59 is supported on a spring seat 60 which has a central leg 61 engaging in a positioning opening 62 formed in a base 63. A tubular spindle 64 is screwed into a platform 65 at its upper end and a head 66 is formed on the bottom of said spindle 64. A collar 67 is screwed onto the upper end of spindle 64 below the platform 65 and a washer 68 is interposed between the collar 67 and ring spring 58. A cylinder 69 extends loosely around the ring spring 58 being secured at its lower end to base 63. A retaining ring 70 is secured to the upper end of cylinder 69 above washer 68. A washer 71 extends between the ring spring 58 and head 66. A lock screw 72 is provided at the top of spindle 64. A housing 73 extends around the helical springs 59 and a viscous liquid 74 is provided around helical springs 59 between housing 73 and cylinder 69 to absorb high frequency vibrations and side sway. A housing section 75 extends downwardly from platform 65 to telescope loosely with housing 73.

I would state in conclusion that while the examples illustrated constitute practical embodiments of my invention, I do not wish to limit myself precisely to these details, since manifestly, the same may be considerably varied without departing from the spirit of the invention as defined in the appended claims.

Having thus described my invention, I claim as new and desire to secure by Letters Patent:

1. In an anti-vibration shock absorber, a base, a platform in spaced relation to said base, a ring spring between said base and platform for absorbing large shocks applied to said platform, a helical spring associated with said ring spring for absorbing steady, small vibrations applied to said platform, a viscous fluid surrounding said helical spring for absorbing high frequency vibrations and side sway, and a container for holding said viscous fluid.

2. In an anti-vibration shock absorber, a base, a platform in spaced relation to said base, a helical spring between said base and platform for absorbing steady, small vibrations applied to said platform, a viscous fluid surrounding said spring for absorbing high frequency vibrations and side sway, a container for said viscous fluid and means associated with said helical spring for absorbing large shocks applied to said platform.

3. In an anti-vibration device, a base, a platform in spaced relation to said base, a helical spring between said base and platform for absorbing vibrations applied to said platform, a container surrounding said spring and rigidly fixed to said base, and a viscous liquid in said container and around said spring for absorbing high frequency vibrations and side sway.

4. In an anti-vibration device, a pair of spaced rigid members, telescoping chambers associated with said members, a ring spring between said members for absorbing large shocks, a helical spring within one of said chambers, and a viscous liquid surrounding said helical spring.

5. In a device of the class described, a pair of spaced rigid members, a ring spring and a concentric helical spring between said members for absorbing vibrations and large shocks, a viscous liquid surrounding said helical spring for absorbing high frequency vibrations and side sway, and a container for said fluid.

6. In an anti-vibration shock absorber, a pair of spaced rigid members, a ring spring connecting said members for absorbing large shocks tending to change the distance between said members, a plurality of helical springs between said members for absorbing steady vibrations applied to one of said members, a chamber surrounding said helical springs, and a viscous liquid in said chamber around said helical springs for absorbing high frequency vibrations and side sway.

7. A shock absorbing unit comprising an upper plate and a lower plate spaced apart vertically, helical spring vibration-absorbing means disposed between said plates for supporting the upper plate resiliently upon the lower plate to enable one of the plates to move vertically relatively to the other in response to high frequency vibrations to which either plate is subjected, inner and outer laterally spaced apart container members supported by said lower plate and spaced from said upper plate to accommodate vertical movement of one plate with respect to the other, said helical spring means being located in the space between said container members, means comprising a ring spring structure disposed within said inner container member and cooperating with said plates for resisting large amplitude vibrations imparted to either plate, and a viscous fluid between said container members and surrounding said helical spring means for damping the vibratory action of said helical spring means.

CARL HUSSMAN